United States Patent

Dovak et al.

[11] Patent Number: 5,567,074
[45] Date of Patent: Oct. 22, 1996

[54] TUBE CLIP

[75] Inventors: James Dovak, Strongsville, Ohio; Thomas E. Bazil, Northville, Mich.; Todd H. Christian, Clinton, Ohio

[73] Assignee: Eaton Corporation, Cleveland, Ohio

[21] Appl. No.: 530,773

[22] Filed: Sep. 19, 1995

[51] Int. Cl.⁶ ................................................ F16L 41/08
[52] U.S. Cl. ............................. 403/197; 403/194; 403/2; 285/162; 285/3
[58] Field of Search ................................. 403/197, 194, 403/192, 2, 12, 13; 16/2, 108; 174/65 G, 65 R; 285/162, 161, 158, 3

[56] References Cited

U.S. PATENT DOCUMENTS

| | | | |
|---|---|---|---|
| 4,131,379 | 12/1978 | Gordy et al. | 403/238 X |
| 4,293,151 | 10/1981 | Manzel | 174/65 R X |
| 4,652,018 | 3/1987 | Boghosian | 285/162 X |
| 4,880,387 | 11/1989 | Stikeleather et al. | 174/65 R X |

FOREIGN PATENT DOCUMENTS 1123040  9/1956  France ............................ 174/65 R

*Primary Examiner*—Anthony Knight
*Attorney, Agent, or Firm*—Albert E. Chrow

[57] ABSTRACT

A clip (100) is provided that has a substantially tubular body member (50) and at least one and preferably two diametrically opposed, outwardly extending tabs (18 and 18') that first engage a side of a frame (6) having an opening (13) through which clip (100) is inserted about a threaded stud or bolt (4) such as a vehicular exhaust tail pipe and which are operative to bend and straighten as a nut (8) rotationally advances along stud or bolt (4) to engage an end (7) of clip (100) and urge clip (100) through opening (13) until nut (8) engages frame (6) to eliminate effect of joint loosening caused by exposure of tabs (18 and 18') to corrosive environments.

7 Claims, 2 Drawing Sheets 5,567,074

TUBE CLIP

INTRODUCTION

This invention relates generally to a clip for securing a tube to a threaded member extending through an opening through a panel or frame and more particularly to a tubular clip that is disposed about the threaded member and has at least one tab that is adapted to straighten to enable a nut that is threadingly engaged with the threaded member threads to engage and move the clip through the opening for a distance sufficient to enable the nut to abut against the panel or frame and eliminate joint loosening effect of a compressed clip tab being deteriorated by a corrosive environment.

BACKGROUND OF THE INVENTION

Clips have been used for many years to secure vehicular engine exhaust tubes or pipes to the vehicle frame. The particular type of clip to which the present invention is addressed has a substantially tubular configuration that is secured to the exhaust pipe and has at least one tab or flange that is compressed by a threaded nut against a panel or frame of the vehicle to enable the clip to secure the tube or pipe to the frame.

The problem in the past with the use of such clips was that the flange or tab would deteriorate over a period from time due to exposure to corrosive environment to the point that it would disintegrate and leave the nut in a loosened condition, resulting in a loose support for the tail pipe.

The clip of the present invention is able to overcome such loosening disadvantage by allowing the nut to press the flange or tab end of the clip into the opening to enable the nut to advance and engage the frame and secure the clip and the tail pipe to the frame without having to have the clip tab or flange of the clip compressed by the nut against the frame and exposed to a corrosive environment.

SUMMARY OF THE INVENTION

Accordingly, it is an object of this invention to provide a clip for securing a tube or pipe (such as a vehicular exhaust tail pipe) to a frame.

It is another object of this invention to provide a clip for securing a stud or bolt to a frame by means of a threaded nut that is prevented from loosening by eliminating the effective exposure of a flange or tab of the clip heretofore compressed between the nut and the frame and subject to corrosive deterioration.

DESCRIPTION OF SOME PREFERRED EMBODIMENTS

Figure 1:
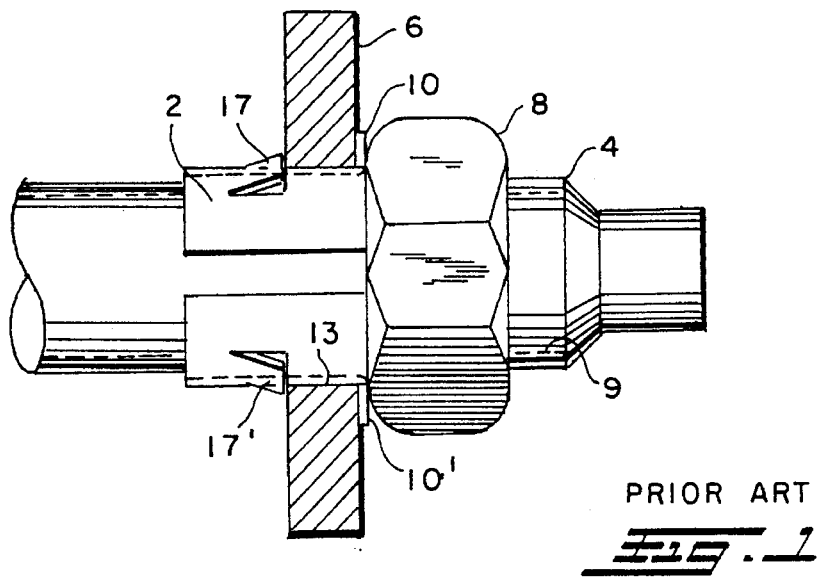
FIG. 1 is a side elevation view of a prior art clip 2 having its tabs 10 and 10' compressed between a threaded nut 8 and a frame 6.

FIG. 1 shows a prior art clip 2 being used to secure a stud or bolt 4 having external threads 9 to a frame 6. Clip 2 has been disposed about stud or bolt 4 within opening 13 through frame 6 such that tabs 10 and 10' are progressively compressed against frame 6 as nut 8 is rotationally advanced along tube 4 toward the viewer's left.

Clip 2 has three substantially equal, circumferentially spaced tangs (only two shown, referenced by numerals 17 and 17') that are axially located from tabs 10 and 10' to engage an opposite side of frame 6 to the side at which nut 8 is located.

In operation, clip 2 is inserted through opening 13 about tube 4 until tabs 10 and 10' abut against the side of frame 6 facing toward nut 8 that has then been threaded onto stud or bolt 4. Tangs 17 and 17' extend outwardly from clip 2 in a direction toward tabs 10 and 10' so that they are able to deflect inwardly as clip 2 is pressed through opening 13 and thence spring outwardly to secure frame 6 between tangs 17 and 17' and tabs 10 and 10' after which nut 8 is then rotationally advanced toward the viewer's left to compress tabs 10 and 10' against the side of frame 6 facing toward nut 8 and, thus, hold tube or pipe 4 securely to frame 6.

As previously described, tabs 10 and 10' are prone to degrade due to their exposure to a corrosive environment over a period of time, which would then leave nut 8 in a loosened condition spaced apart from frame 6 with the result being a loosened securement of tube or pipe 4 to frame 6.

Figure 2:
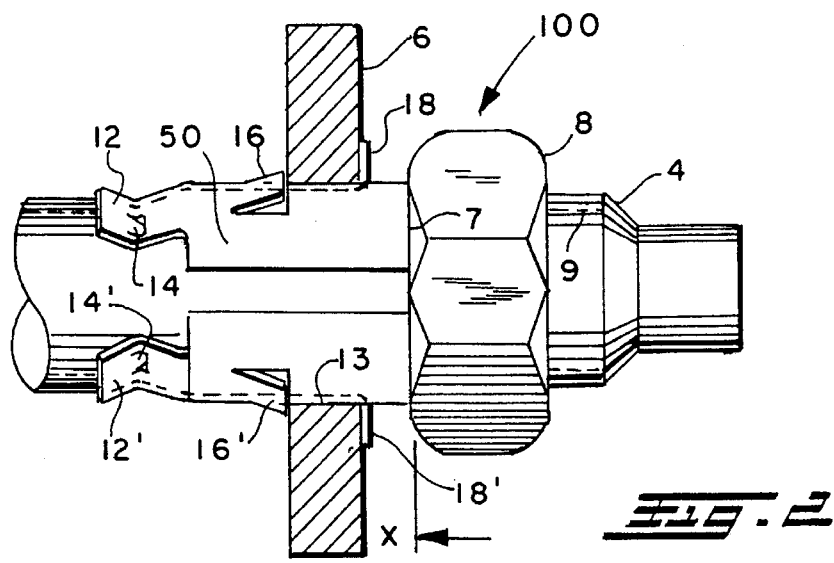
FIG. 2 is a side elevation view of an embodiment of the clip of the invention referenced by numeral 100.
Figure 3:
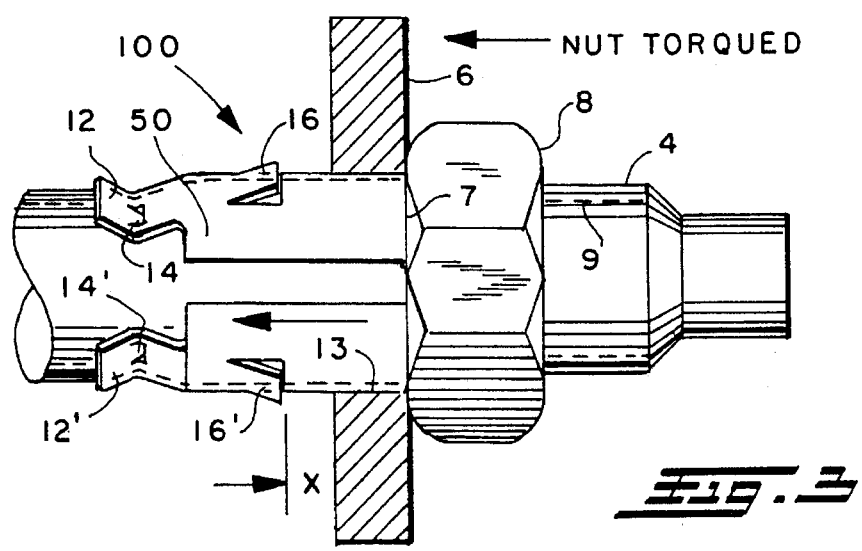
FIG. 3 is a side elevation view of clip 100 of FIG. 2 after a nut 8 has urged it through opening 13 through frame 6.
Figure 4:
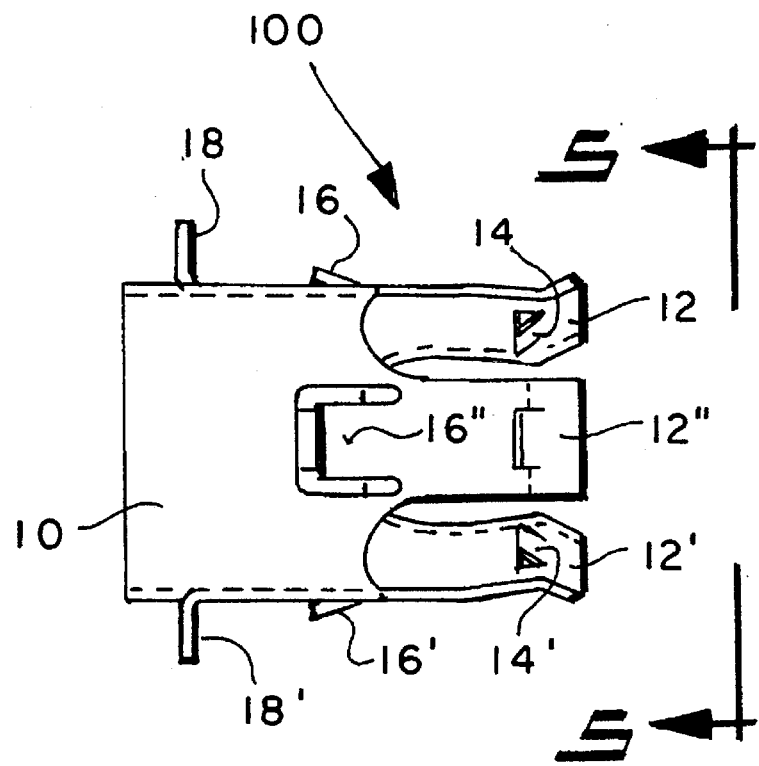
FIG. 4 is a side elevation view of clip 100 alone.

FIGS. 2–4 illustrate an embodiment of the clip of the invention referenced by numeral 100. Clip 100 has a body member 50 that is preferably slit longitudinally along one side to provide a "C" type cross-section such as that shown in FIG. 5. The open-sided configuration of clip 100 enables it to be easily disposed about threads 9 of stud or bolt 4.

Figure 5:
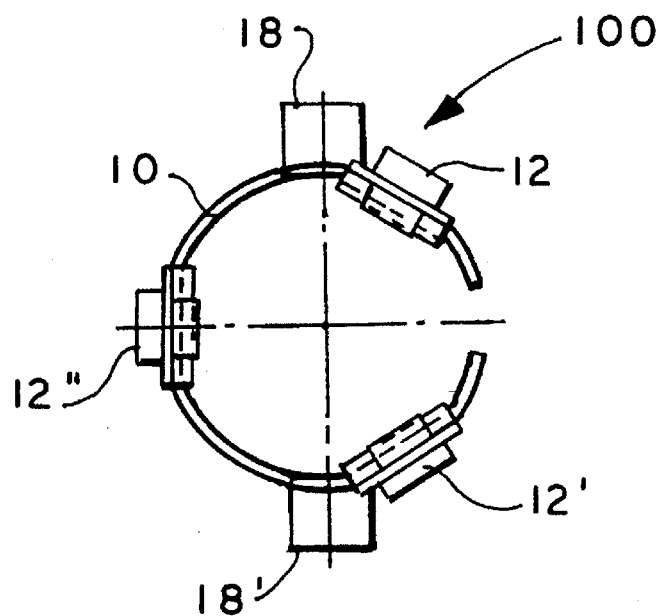
FIG. 5 is an end view of clip 100 of FIG. 4 taken along view line 5–5.

Clip 100 has at least one resilient finger 12 and preferably three resilient fingers 12, 12' and 12"(such as shown in FIG. 5) that are substantially equi-circumferentially spaced-apart from each other.

Each of fingers 12, 12' and 12" have respective prongs 14, 14' and 14"(only prongs 14 and 14' are shown in FIGS. 2 and 3) that extend inwardly from the resilient fingers in a direction toward tabs 18 and 18' and are operative to engage threads 9 to prevent clip 100 from moving in a direction toward the viewer's right in FIGS. 2 and 3 and yet will enable movement of clip 100 through opening 13 toward the viewer's left, as shown in FIG. 3.

Clip 100 has at least one and preferably a pair of diametrically opposed tabs 18 and 18' shown in FIGS. 2–5 that are bent outwardly such that they engage the side of frame 6 facing toward nut 8. Note that tabs 18 and 18' are not located at end 7 of clip 100 but rather are bent upwardly a predetermined distance "X" therefrom such that when nut 8 is torqued or rotationally advanced along threads 9 in a direction toward the viewer's left a distance "X", it will engage tabs 18 and 18' and urge them against frame 6 and thence cause them to break off or deflect radially inwardly to enable clip 100 to be moved through opening.

Clip 100 has at least one and preferably three substantially equal, circumferentially spaced tangs 16, 16' and 16"(shown in FIG. 4) that are disposed intermediate prongs 14, 14' and 14", and tabs 18 and 18' and extend outwardly from clip 100 in a direction toward end 7. Tangs 16, 16' and 16" are operative to deflect inwardly to enable clip 100 to move through opening 13 in a direction toward the viewer's left in FIG. 3 and are spaced apart from end 7 for a predetermined distance to enable them to spring outwardly and engage the side of frame 6 facing away from tabs 18 and 18' when tabs 18 and 18' engage the side of frame 6 facing toward nut 8 so as to secure clip 100 to stud or bolt 4 before nut 8 is torqued toward the viewer's left, as shown in FIG. 2.

In operation, as shown in FIG. 3, rotational advancement of nut 8 toward the viewer's left in FIG. 2 enables nut 8 to engage end 7 of clip 100. Further rotational advancement of nut 8 toward the viewer's left causes tabs 18 and 18' to straighten or fracture while clip 100 is moved through opening 13 in the direction of the arrow in FIG. 3 until nut 8 engages the side of frame 6 facing there toward, resulting in stud or bolt 4 being secured to frame 6 by the cooperation between nut 8 and prongs 14, 14' and 14", compressed to enable the elimination of having to have tabs or a flange between nut 8 and the frames heretofore subject to corrosive deterioration.

The clip of the present invention may be made from any resilient material of which aus tempered 1050 steel about 0.017 inch thick has been found to be of particular advantage for use in vehicular exhaust tail pipe applications.

What is claimed is:

1. A clip for securing a tube having an external threaded section to a frame having an opening therethrough through which the tube extends with the threaded section adjacent one side of the frame and having a nut threadingly engaged therewith, said clip disposed about the tube within the opening and extending therefrom to opposite ends respectively disposed a predetermined distance away from opposite sides of the frame, at least one resilient finger extending away from an end of the clip facing away from the nut on one side of the frame, said finger receivable through the opening and having a prong extending therefrom in a direction angularly inwardly toward the frame and operative to engage the tube and inhibit movement of the clip in a direction toward the frame;

at least one tab bent outwardly from the clip on an opposite side of the frame, said tab disposed a predetermined distance from the end of the clip facing toward the nut and operative to abut against a side of the frame facing toward the nut;

at least one tang extending angularly outwardly from the clip in a direction toward the side of the frame facing away from the nut, said tang operative to deflect inwardly upon receipt through the opening and thence, to spring outwardly to engage the side of the frame facing away from the nut and cooperate with the tab in securing the frame therebetween;

and said tab operative, upon advancement of the nut toward the frame, to straighten sufficiently to enable the nut to move the clip through the opening and abut against the frame.

2. The clip of claim 1 wherein the tube is a motor vehicle exhaust pipe.

3. The clip of claim 1 wherein the clip has a "C" shaped cross-section.

4. The clip of claim 1 having two of the tabs disposed substantially diametrically opposite to each other.

5. The clip of claim 1 having three of the fingers substantially equi-circumferentially spaced from each other.

6. The clip of claim 1 having three of the tangs disposed substantially equi-circumferentially spaced from each other.

7. The clip of claim 1 having three of the fingers and three of the tangs disposed in substantially equi-circumferentially spaced-apart relationship.

\* \* \* \* \*